Patented June 1, 1954

UNITED STATES PATENT OFFICE 2,680,076

PROCESS OF CANNING FISH AND PRODUCTS THEREOF

Robert L. Swaine, Brighton, Mass., assignor, by mesne assignments, to Gorton-Pew Fisheries Company, Ltd., Gloucester, Mass., a corporation of Massachusetts No Drawing. Application December 10, 1949,
Serial No. 132,400

12 Claims. (Cl. 99—188)

This invention relates to the treatment of fish and shell fish and more particularly to their treatment with amino polyacetic acid compounds to prevent the formation of struvite crystals when canned.

It is well known that canned cooked shell fish, such as lobsters, shrimp and crab meat, as well as canned fish, such as haddock, cod, and other members of the Gadidae family, and salmon, develop transparent crystals known as struvite upon standing. Fish having a high oil content, such as tuna, mackerel or the like, or fish canned in oil, have less of a tendency to form these crystals. While not harmful, either chemically or physically, struvite crystals do resemble glass and, when present, render canned seafood unfit to eat in the opinion of many people.

Struvite chemically is hydrated magnesium ammonium phosphate with the theoretical chemical formula $Mg(NH_4)(PO_4).6H_2O$, and it is crystals of this composition that slowly form in canned fish and shell fish upon standing, usually on the inside surface of the can, and on the surface of the meat. The amount of magnesium ions, ammonium ions, and phosphate ions in the flesh of the fish and shell fish, and in the surrounding fluid or juice, varies considerably with the type of product and the method of canning it, but is generally sufficient to form struvite crystals.

It is an object, therefore, of this invention to prevent the formation of struvite crystals in canned fish and shell fish.

This and other objects which will become apparent may be attained by adding to the fish and shell fish an amino polyacetic acid in an amount at least sufficient to keep in solution all the magnesium present in the liquid juice of the product.

The amino polyacetic acid compounds may be defined as those having the general formula

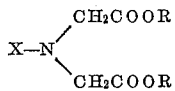

where R is hydrogen or an alkali such as ammonium, sodium, potassium, or lithium, and X is —$CH_2COOR$ or

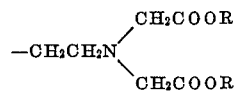

It has been found that an amino polyacetic acid compound as defined above increases the solubility of magnesium compounds and increases the usual shelf life of canned fish and shell fish or, if desired, entirely prevents the formation of struvite crystals therein. Extensive analyses of various canned fish and shell fish disclose a wide variation in the magnesium compound content up to having an equivalent magnesium content as high as 0.04% of the total weight.

In practice it has been found that the addition of 0.125% to ½% of an amino polyacetic acid compound such as the disodium salt of ethylene diamine tetraacetic acid

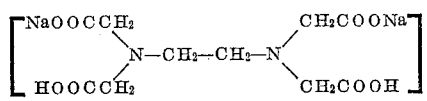

based on the moisture content in shell fish and fish will suppress the formation of struvite effectively. Amounts in excess of ½% are not additionally effective. More amine, while not harmful, adds no further stability and is not required. Other amino polyacetic acid compounds which are similarly useful include ethylene diamine tetraacetic acid, the mono, tri and tetra sodium salts of ethylene diamine tetraacetic acid, the other alkali salts of these compounds as well as the acid and alkali salts of tris [carboxy methyl] amine.

Originally all the magnesium is, of course, present as a part of the flesh and bone of the shell fish or fish. Normally after the shell fish or fish has been canned a slow process of release of magnesium ions lasting from about three to six years takes place, and struvite crystals gradually build up. Apparently, the magnesium, ammonium, and phosphate ions are gradually released into the juice and struvite crystals form to remove these ions from solution. To suppress or prevent the formation of struvite, it has been found that the addition of an amino polyacetic acid compound is required. The exact amount of an amino polyacetic acid compound is dependent upon the shelf life desired and upon the total amount of magnesium available for struvite formation. If indefinite shelf life is desired, there must be sufficient of the amino polyacetic acid compound to insure solubility of all the magnesium. If it is sufficient to insure a relatively long shelf life less amino polyacetic acid compound is required. Additions insufficient to put all the magnesium in solution will reduce the amount of crystals formed and they will be smaller, and therefore less undesirable. In any case at least about 0.125% of the amino polyacetic compound based on the moisture content is required to obtain appreciable results.

The invention described herein is particularly applicable to the canning of seafood as the problem with such food appears to be most acute.

In particular it has been found that salmon and members of the Gadidae family, as well as crab, lobster and shrimp are particularly troublesome and struvite formation in these foods is readily controlled by the process.

In the practice of my invention, I find that it is most convenient to prepare and cook the shell fish or fish in the usual manner as by autoclaving, but the method of cooking is immaterial. The amino polyactic acid compound may be added at any time prior to closing the cans, and conveniently may be added to the fish or shell fish either just prior to autoclaving, or just prior to filling the can. It is preferred that the addition be made at the end of the cooking period together with salt as a matter of convenience. When the cooking is completed, the fish or shell fish is placed in cans in the usual way and stored without any particular precautions.

To illustrate the invention further the following examples may be given:

Fish fillets were cooked in an autoclave at about 15 lbs. steam pressure for 20 minutes. The cooked fish was adjusted to a moisture content of 85% with broth made by broiling fish heads in water, and then ground to a fine mixture. The broth was used for the purpose of increasing the nutritional value.

To a portion of this mixture was added 0.5% of the disodium salt of ethylene diamine tetraacetic acid by weight on the total moisture content of the product. After addition of the disodium salt the mixture was stirred for 10 minutes and filled into 14 oz. cans. A portion to which nothing had been added was reserved as a control and also canned. The canned portions were sealed and autoclaved for one hour at 15 lbs. steam pressure. When tested 15 months later the control was found to contain 0.03% struvite crystals by weight, the 0.5% treated portion contained no struvite crystals.

The struvite determination was made in accordance with the following method: Fish material is mixed with about three times its volume of a 1.6 specific gravity aqueous sodium iodide solution so as to adjust the resulting liquid mixture to a specific gravity of about 1.46. In order to prevent struvite from dissolving during this treatment, this solution is slightly alkalized with sodium hydroxide. The mixture is then well stirred and subsequently allowed to settle for about one-half hour. Flesh and excess liquid is decanted from the residue which settles to the bottom, which residue contains bone fragments and struvite when such is present. This residue then is washed with the above sodium iodide solution and then with alcohol to remove any sodium iodide. The dried residue is then separated into struvite and bone in a mixture of carbon tetrachloride, and tetrabromoethane. This mixture is adjusted to a specific gravity of about 1.76 from which the struvite is removed as it is found floating at the top. The struvite then is dissolved in acid and the magnesium content determined by conventional analytical methods and the theoretical amount of struvite calculated.

I claim:

1. Canned fish having incorporated therewith an amino polyacetic acid compound having the formula

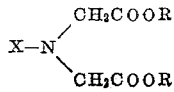

where R is a member of the group consisting of H, NH$_4$, Na, K, and Li and X is a member of the group consisting of —CH$_2$COOR and

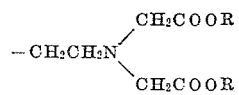

in an amount sufficient to substantially suppress the crystallization of struvite.

2. The product in accordance with claim 1 wherein the amino polyacetic acid compound is present in an amount of at least 0.125% by weight based on the total moisture content.

3. The product in accordance with claim 1 wherein the fish is salmon.

4. The product in accordance with claim 1 wherein the fish is a member of the Gadidae family.

5. Canned fish having incorporated therewith the disodium salt of ethylene diamine tetraacetic acid in an amount of at least 0.125% by weight based on the total moisture content.

6. Canned salmon having incorporated therewith the disodium salt of ethylene diamine tetraacetic acid in an amount of at least 0.125% by weight based on the total moisture content.

7. Canned fish of the Gadidae family having incorporated therewith the disodium salt of ethylene diamine tetraacetic acid in an amount of at least 0.125% by weight based on the total moisture content.

8. Canned fish having incorporated therewith an amino polyacetic acid compound having the formula

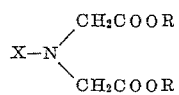

where R is a member of the group consisting of H, NH$_4$, Na, K, and Li and X is a member of the group consisting of —CH$_2$COOR and

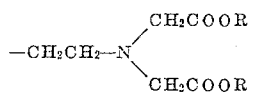

in an amount of about 0.5% by weight based on the total moisture content.

9. In the process of canning fish the step of adding to said fish prior to sealing the cans an amino polyacetic acid compound having the formula

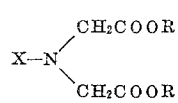

where R is a member of the group consisting of H, NH$_4$, Na, K, and Li and X is a member of the group consisting of —CH$_2$COOR and

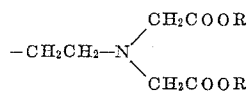

in an amount of about 0.5% by weight based on the total moisture content, and then cooking the thus-treated food while in the cans.

10. In the process of canning fish the step of adding to said fish prior to sealing the cans an amino polyacetic acid compound having the formula

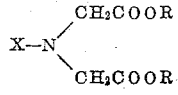

where R is a member of the group consisting of H, NH₄, Na, K and Li and X is a member of the group consisting of —CH₂COOR and

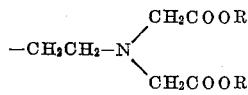

in an amount of at least 0.125% by weight based on the total moisture content.

11. The process in accordance with claim 10 wherein the amino polyacetic acid compound is the disodium salt of ethylene diamine tetraacetic acid.

12. The process in accordance with claim 11 wherein the fish is salmon.

References Cited in the file of this patent

UNITED STATES PATENTS

| Number | Name | Date |
|---|---|---|
| 2,088,831 | Ash et al. | Aug. 3, 1937 |
| 2,381,019 | Webb | Aug. 7, 1945 |

OTHER REFERENCES

"Chemical Abstracts," vol. 36, page 7165⁹, article entitled Struvite In Canned Fish Products by R. T. Merwin.

"Structure And Composition of Foods," 1937, vol. III, by A. L. Winton, published by John Wiley and Sons, Inc., N. Y. city, page 485.

"The Properties and Uses of Ethylenediamine Tetra Acetic Acid and Its Salts," pub. by Berswerth Chem. Co.

"The Modern Chelating Agent," Technical Bulletin #1, pub. by Berswerth Chem. Co.